(12) United States Patent
Beaudet (10) Patent No.: US 8,104,604 B2
(45) Date of Patent: Jan. 31, 2012

(54) LUMBER TRANSFER SYSTEM

(75) Inventor: Louis Beaudet, Ste-Sophie-d'Halifax (CA)

(73) Assignee: Carbotech International, Plessiville (CA)

( * ) Notice: Subject to any disclaimer, the term of this patent is extended or adjusted under 35 U.S.C. 154(b) by 203 days.

(21) Appl. No.: 12/622,325

(22) Filed: Nov. 19, 2009

(65) Prior Publication Data

US 2010/0252397 A1    Oct. 7, 2010

Related U.S. Application Data

(60) Provisional application No. 61/165,559, filed on Apr. 1, 2009.

(51) Int. Cl.
*B65G 47/31*      (2006.01)

(52) U.S. Cl. ............... 198/460.1; 198/459.6; 198/464.2

(58) Field of Classification Search ............... 198/460.1, 198/460.2, 460.3, 464.1, 464.2, 464.3, 459.1, 198/459.5, 459.6, 463.4
See application file for complete search history.

(56) References Cited

U.S. PATENT DOCUMENTS

| | | | | |
|---|---|---|---|---|
| 2,679,919 A * | 6/1954 | De Koning | ............... | 198/463.3 |
| 3,147,842 A * | 9/1964 | Rambo et al. | ............... | 198/434 |
| 4,869,360 A * | 9/1989 | Brown et al. | ............... | 198/460.1 |
| 4,945,976 A * | 8/1990 | Ritola | ............... | 198/459.5 |
| 5,419,425 A * | 5/1995 | Goater | ............... | 198/461.3 |
| 5,518,106 A * | 5/1996 | Allard | ............... | 198/459.5 |
| 5,662,203 A * | 9/1997 | St-Pierre et al. | ............... | 198/463.5 |
| 6,564,926 B2 * | 5/2003 | Dube et al. | ............... | 198/459.5 |
| 6,702,096 B2 * | 3/2004 | Koskovich et al. | ............... | 198/459.5 |
| 6,956,197 B2 * | 10/2005 | Lövkvist | ............... | 250/223 R |

FOREIGN PATENT DOCUMENTS

| | | |
|---|---|---|
| CA | 1171020 | 7/1984 |
| CA | 1228873 | 11/1987 |
| CA | 2133927 | 4/1995 |
| CA | 2148322 | 11/1996 |
| CA | 2151768 | 12/1996 |
| CA | 2185609 | 12/1996 |
| CA | 2185620 | 3/1998 |
| CA | 2238231 | 11/1999 |
| CA | 2271175 | 11/2000 |
| CA | 2577656 | 8/2008 |

* cited by examiner

*Primary Examiner* — Mark A Deuble
(74) *Attorney, Agent, or Firm* — Benoît & Côté

(57) ABSTRACT

A lumber transfer system and a method for individually transferring lumbers from a feeding conveyor to an outfeed conveyor. Detectors are used for monitoring a lumber presence along a corridor on a longitudinal conveying surface. Motorized blocking fingers located about the corridor and transversally spaced along the conveying surface are provided and are configured for moving between blocking and unblocking positions. A controller is also provided, the controller having at least one input for receiving detecting signals from the detectors respectively, the detecting signals of the detectors being respectively associated to the motorized blocking fingers. The controller also has at least one output for sending independent control signals to the motorized blocking fingers respectively, in response to the detecting signals, for moving the respective blocking fingers for which a lumber presence is detected from a blocking to an unblocking position, and otherwise keeping the respective motorized blocking fingers in their blocking position.

20 Claims, 5 Drawing Sheets

LUMBER TRANSFER SYSTEM

CROSS-REFERENCE TO RELATED APPLICATIONS

This application claims priority to U.S. Provisional Application No. 61/165,559 filed Apr. 1, 2009 and is incorporated in its entirety.

BACKGROUND OF THE INVENTION

1. Field of the Invention

The present invention relates to a lumber transfer system. More particularly, the present invention relates to a lumber transfer system for transferring pieces of lumber from a feeding conveyor to an outfeed conveyor.

2. Description of the Related Art

It is well known in the art that in a sawmill or a lumber mill, transportation of the lumbers requires the use of conveyors. Usually, the lumbers emerge from the mill in random order onto a feeding conveyor. Certain given stages of the transformation process require that the lumbers be regularly spaced apart on a conveyor. It is therefore necessary to provide a system for transferring the lumbers from the feeding conveyor to another conveyor such that the lumbers are regularly spaced thereon. In order to be efficient, lumber transfer systems should allow handling and transfer of any type, size and shape of lumbers such as stem, saw log, wood plank, beam and the like. Furthermore, they should also allow a high transfer rate of lumbers. In fact, the efficiency of a lumber mill generally depends greatly on the production rate attainable. The number of lumbers transferred per minute from one conveyor to another is thus an important factor affecting greatly the production rate of lumber mills.

Examples of transfer lumber systems known to the Applicant are described in the following Canadian patents and/or patent applications: 1,171,020; 1,228,873; 2,133,927; 2,148,322; 2,151,768; 2,185,609; 2,185,620; 2,238,231; 2,271,175; and 2,577,656.

It is also well known in the art that lumbers arriving on the feeding conveyor prior to being transferred and equally spaced by the transfer system are often intermingled and comprise different pieces of various lengths. Prior to being transferred, the lumbers are accumulated on an accumulating portion of the feeding conveyor, where typically, conveying chains roll at high speed. When a short lumber is followed by a long one, the long lumber has a tendency to pivot around the short lumber. Since the extremity of the longer lumber stands out relative to the downstream shorter lumber, this longer extremity is driven by the chains, and/or in some cases, by a pushing action of other following lumbers, and this situation leads to an important problem where the transfer system will load the long lumber together with the short one, while only the short lumber should have been transferred. When such problem occurs, production must be stopped and an operator must space out and put the lumbers back in order. Such a problem commonly occurs in lumber mills and affects the overall efficiency of the mills.

Hence, in light of the aforementioned, there is a need for an improved system which, by virtue of its design and components, would be able to overcome or at least minimize some of the aforementioned prior art problems.

SUMMARY OF THE INVENTION

The object of the present invention is to provide a lumber transfer system winch satisfies some of the above-mentioned needs and which is thus an improvement over other related lumber transfer systems, devices and/or methods known in the art.

In accordance with the present invention, the above object is achieved, as will be easily understood, with a lumber transfer system such as the one briefly described herein and such as the one exemplified in the accompanying drawings.

More particularly, according to the present invention, there is provided a lumber transfer system for transferring pieces of lumber along a conveying path, the lumber transfer system comprising:

a feeding conveyor having a conveying surface for receiving the pieces of lumber in a substantially transverse orientation with respect to the conveying path, and for conveying the pieces of lumber therealong toward an exit, the feeding conveyor further defining a detection corridor oriented substantially transversely with respect to the conveying path;

detectors being spaced apart along the detection corridor of the feeding conveyor, each detector being used for locally monitoring a lumber presence and for producing a corresponding detection signal;

blocking fingers located in proximity to the detectors and spaced apart transversely along the conveying surface, each of the blocking fingers being independently operable between a blocking configuration for locally blocking the pieces of lumber and an unblocking configuration for locally conveying the pieces of lumber; and a controller having:
  input devices, each of the input devices being operatively connected to one of the detectors for receiving the corresponding detection signal; and
  output devices, each of the output devices being operatively connected to one of the blocking fingers for transmitting an independent control signal to a corresponding one of the blocking fingers in response to a detection signal of an associated detector, to move said corresponding one of the blocking fingers in the unblocking configuration when the lumber presence is locally detected and in the blocking configuration when the lumber presence is locally undetected.

According to another aspect of the present invention, there is also provided a lumber transfer system for improving individual transfer of elongated pieces of lumber from a feeding conveyor to an outfeed conveyor, the lumber transfer system comprising:

a feeding conveyor having a conveying surface for conveying the pieces of lumbers along a conveying path, the feeding conveyor having an inlet for receiving the pieces of lumber in a substantially transverse orientation with respect to the conveying path, and an outlet for dispensing pieces of lumber in an aligned manner with respect to each other, the feeding conveyor comprising a detection corridor extending substantially across the conveying surface in a direction substantially transverse with respect to the conveying path;

detectors being spaced apart about the detection corridor of the feeding conveyor, each of the detectors being positioned at a designated location for locally detecting the presence of a segment of a first piece of lumber and for generating a corresponding detection signal;

blocking fingers being spaced apart about the detection corridor, adjacent to the detectors, each of the blocking fingers being positioned at a designated location for locally and selectively blocking the passage of a segment of a second piece of lumber following the first piece of lumber on the conveying surface in response to a corresponding control signal, each of the blocking fingers being operable between a conveying configuration for locally allowing a passage of said segment of the first piece of lumber along the conveying surface, and a blocking configuration for locally blocking the passage of said segment of the second piece of lumber following the first piece of lumber, each of the blocking fingers being operable independently from one another in response to respective control signals; and a controller having:
- at least one input device operatively connected to the detectors for receiving corresponding detection signals of each one of the detectors positioned about the detection corridor; and
- at least one output device connected to the blocking fingers for sending corresponding control signals to each one of the blocking fingers positioned about the detection corridor, the controller being configured for sending an independent control signal to each one of the blocking fingers in response to a corresponding detection signal of an associated detector in order to be able to individually, independently and selectively operate all of the blocking fingers, such that a given blocking finger is operated in the conveying configuration when the presence of a segment of the first piece of lumber is locally detected by its associated detector for allowing passage of the first piece of lumber, said given blocking finger being further operated in the blocking configuration when the presence of a segment of the first piece of lumber is locally undetected by its associated detector for blocking the passage of the second piece of lumber following the first piece of lumber on the conveying surface along said given blocking finger, in order to orientate pairs of first and second pieces of lumber with respect to each other, so as to improve individual transferring into the outfeed conveyor.

According to another aspect of the present invention, there is also provided a method for individually transferring substantially parallel pieces of lumber on a feeding conveyor toward an exit thereof, along a conveying path of a lumber transfer system, the pieces of lumber being provided in a substantially transverse orientation with respect to the conveying path, the method comprising the steps of:

a) monitoring a lumber presence along a detection corridor on a conveying surface of the feeding conveyor, using detectors spaced apart along the detection corridor, the detection corridor being oriented substantially transversely with respect to the conveying path;

b) associating the detectors to motorized blocking fingers located in proximity to the detectors and spaced apart transversally along the conveying surface, each of the blocking fingers being independently operable between a blocking configuration for locally blocking the pieces of lumber and an unblocking configuration for locally conveying the pieces of lumber, and c) independently commanding each of the blocking fingers for which a lumber presence is detected in step a) into the unblocking configuration and each of the blocking fingers for which a lumber presence is undetected in step a) into the blocking configuration.

Advantageously, the lumber transfer system and method according to the present invention ensure that a grasping assembly of a corresponding outfeed conveyor will transfer only one lumber at a time, by individually controlling blocking fingers and thereby preventing the portion of a longer lumber to pivot around the extremity of a shorter downstream lumber, and thereby preventing it from being grasped and transferred into the outfeed conveyor with the shorter lumber.

According to yet another aspect of the present invention, there is provided a mill provided with the above-mentioned lumber transfer system and/or components thereof.

According to yet another aspect of the present invention, there is provided a method of installing the above-mentioned lumber transfer system.

According to yet another aspect of the present invention, there is provided a method of operating the above-mentioned lumber transfer system and/or mill.

According to yet another aspect of the present invention, there is provided a kit with corresponding components for assembling the above-mentioned lumber transfer system and/or mill.

According to yet another aspect of the present invention, there is also provided a method for assembling components of the above-mentioned kit.

According to yet another aspect of the present invention, there is also provided a method of doing business with the above-mentioned kit, method(s), lumber transfer system and/or mill.

The objects, advantages and other features of the present invention will become more apparent upon reading of the following non-restrictive description of preferred embodiments thereof, given for the purpose of exemplification only, with reference to the accompanying drawings.

While the invention will be described in conjunction with examples of preferred embodiments, it will be understood that they are not intended to limit the scope of the invention to such embodiments.

DETAILED DESCRIPTION OF PREFERRED EMBODIMENTS OF THE INVENTION

In the following description, the same numerical references refer to similar elements. The embodiments, geometrical configurations, materials mentioned and/or dimensions shown in the figures or described in the present description are preferred embodiments only, given for exemplification purposes only.

Furthermore, to preserve the clarity of the drawings, some reference numerals may have been omitted if they were already identified in a preceding figure.

Moreover, although the present invention was primarily designed for improving the conveyance or transfer of pieces of lumber from a feeding conveyor to an outfeed conveyor in a lumber mill, it may be used with other types of objects and for other purposes, in other fields, as apparent to a person skilled in the art. For this reason, expressions such as "conveying", "transferring", "lumber", "mill", etc., used herein should not be taken as to limit the scope of the present invention and includes all other kinds of objects or fields with which the present invention could be used and may be useful.

Moreover, in the context of the present invention, the expressions "system", "assembly", "unit", "device" and any other equivalent expression and/or compound words thereof known in the art will be used interchangeably. Furthermore, the same applies for any other mutually equivalent expressions, such as "lumber", "elongated piece of lumber", "log", "plank", "board" and the like, or "segment", "portion" and "section", as well as "unblocked" and "conveying", for example, as also apparent to a person skilled in the art. Furthermore, and also in the context of the present description, the expressions "align", "orientate", "place" and "space" may also be used interchangeably, as well as "finger" and "stopper", or even "second", "subsequent" and "upstream", as also apparent to a person skilled in the art.

In addition, although the preferred embodiment of the present invention as illustrated in the accompanying drawings may comprise various components, and although the preferred embodiment of the lumber transfer system as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the lumber transfer system and corresponding parts according to the present invention, as will be briefly explained hereinafter and as can be easily inferred herefrom by a person skilled in the art, without departing from the scope of the invention.

Broadly described, the present invention, as illustrated in the accompanying drawings, relates to a lumber transfer system for improving the transfer of lumbers from a feeding conveyor to an outfeed conveyor.

As previously explained, and as will be understood in greater detail hereinbelow, the present invention is a substantial improvement over conventional lumber transfer systems or methods in that it comprises components and features that enable to individually control blocking fingers in response to corresponding detection signals so as to prevent a portion of a longer lumber to pivot around the extremity of a shorter downstream lumber, in order to prevent the longer lumber from being grasped and transferred into the outfeed conveyor with the shorter lumber.

An important advantage resulting from the present invention is that human intervention is substantially reduced in order to ensure a proper alignment between a pair of neighbouring lumbers (i.e. a pair of first and second pieces of lumbers, the first one being conveyed downstream, and the second or "subsequent" one, following upstream along the conveyor), especially in cases when one is much longer than the other, and that the resulting parallel lumbers having thus been realigned or reoriented by the lumber transfer system can thus be individually transferred from the feeding conveyor to a outfeed conveyor in a much improved manner (faster, more reliable, etc.), thereby significantly improving productivity and other desirable factors related to the operation of a mill.

Figure 1:
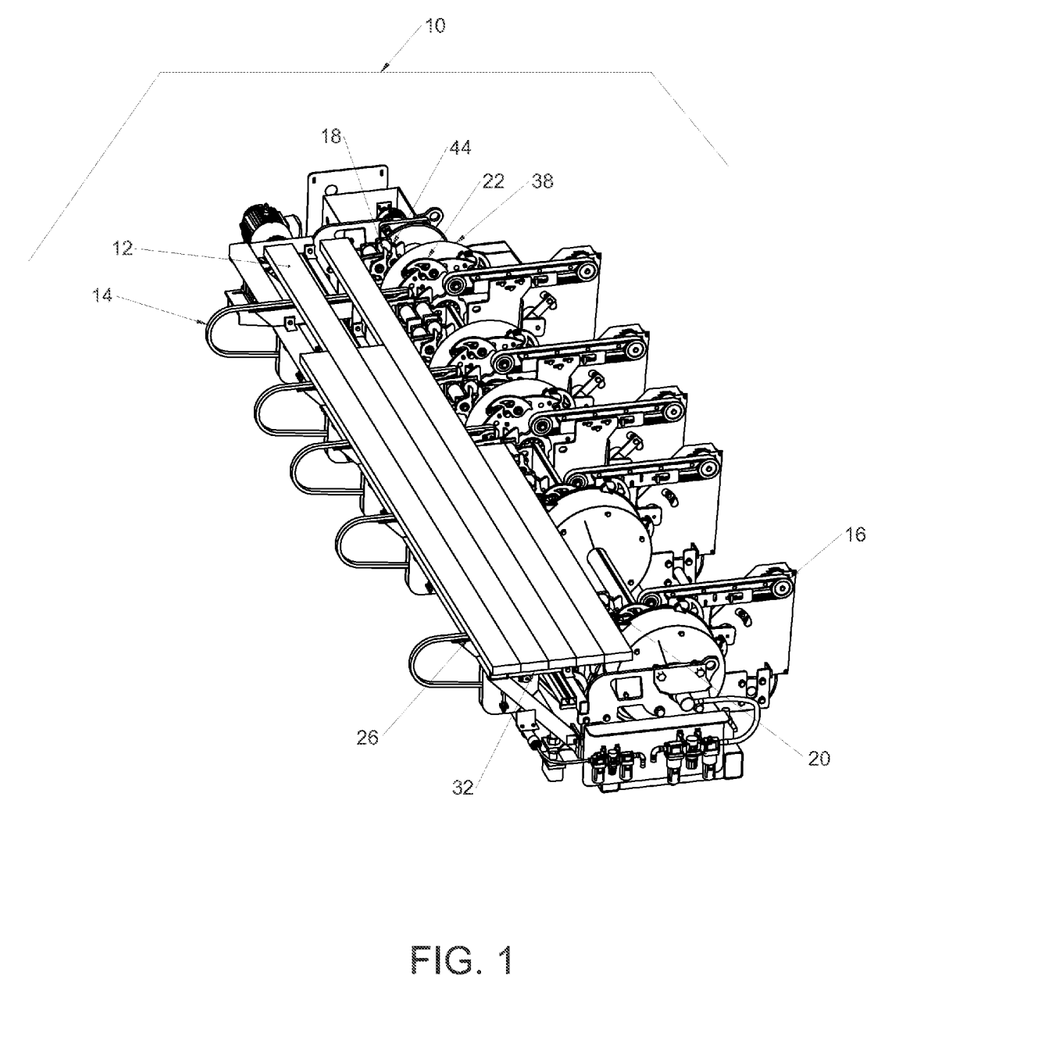
FIG. 1 is a perspective view of a lumber transfer system according to a preferred embodiment of the present invention.

List of Numerical References for Some of the Corresponding Preferred Components Illustrated in the Accompanying Drawings 10. lumber transfer system
12. lumber (i.e. piece of elongated lumber)
14. feeding conveyor
16. outfeed conveyor
18. blocking finger
20. exit (of feeding conveyor)
22. grasping assembly
24. controller
26. conveying surface
28. detector
30. detection corridor
32. reference side
38. disk (of grasping assembly)
40. input device
42. output device
44. positioning finger Referring to FIG. 1, there is shown a lumber transfer system 10 according to a preferred embodiment of the present invention. The lumber transfer system 10 is used for individually transferring substantially parallel lumbers 12 from a feeding conveyor 14 to an outfeed conveyor 16, and regularly spacing the lumbers 12 on said outfeed conveyor 16.

Preferably, the lumber transfer system 10 includes:
a feeding conveyor 14;
blocking (or stopping) fingers 18 (more clearly shown in FIG. 3) for stopping a lumber 12 arriving at the exit 20 of the feeding conveyor;
a grasping assembly 22 for regularly transferring the lumbers 12 onto another conveyor;
an outfeed conveyor 16 for conveying the transferred and regularly spaced lumbers 12; and
a controller 24 for synchronizing the overall operation of the system 10.

The feeding conveyor 14, preferably a belt or a chain conveyor, has a longitudinal conveying surface 26 (best shown in FIG. 3) over which substantially parallel pieces of lumbers 12 are conveyed. Typically, the feeding conveyor 14 receives lumbers 12 accumulating thereon from a plant conveyor which is part of the mill. The lumbers 12 may be intermingled and are generally of various lengths and widths. Although it is not a prerequisite, the lumbers 12 conveyed on the feeding conveyor 14 are preferably aligned on one side 32 (often referred to as the 0" side). Alternatively, they may be placed at any suitable position. For example, the lumbers 12 may be centered with respect to the conveying surface 26. As shown, the lumbers 12 are conveyed in a direction transverse to their length.

Figure 2:
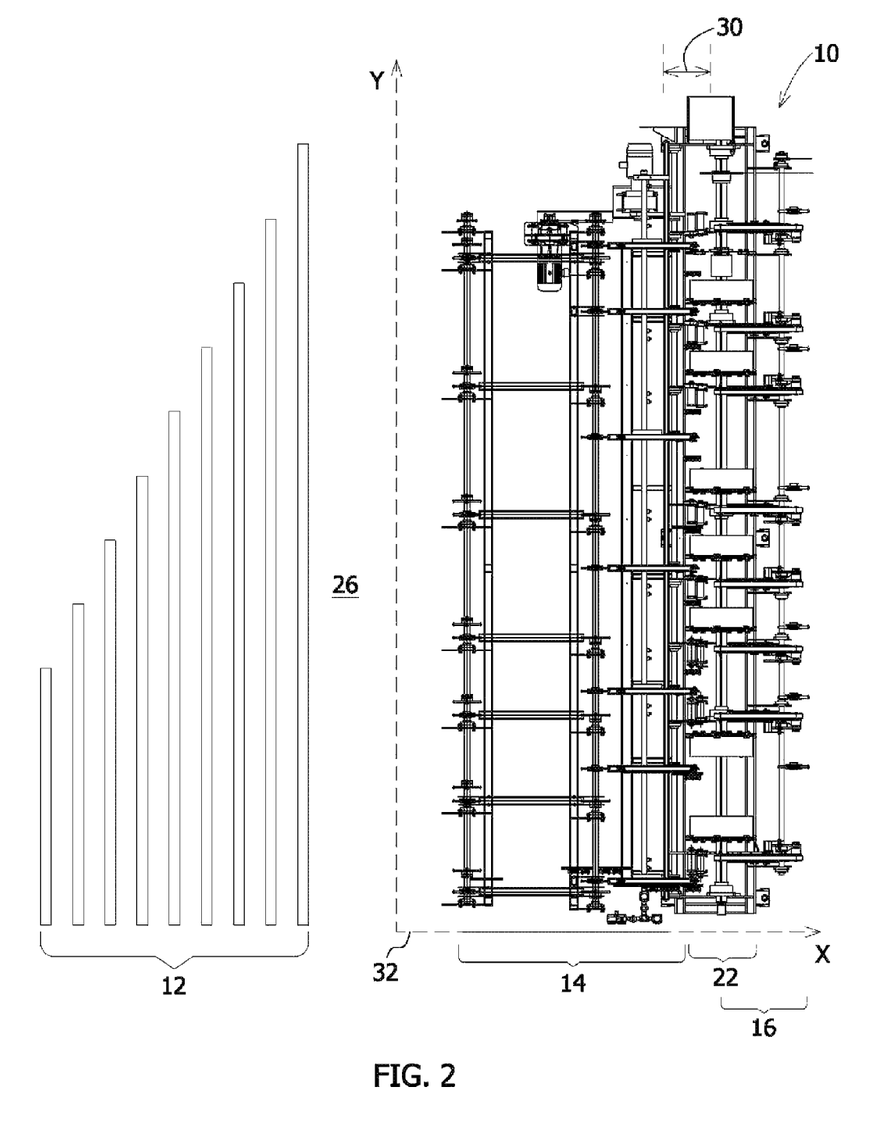
FIG. 2 is a schematic top view of a portion of a lumber transfer system according to another preferred embodiment of the present invention, the lumber transfer system being shown along with a variety of different pieces of lumber which may be processed with the lumber transfer system.
Figure 5:
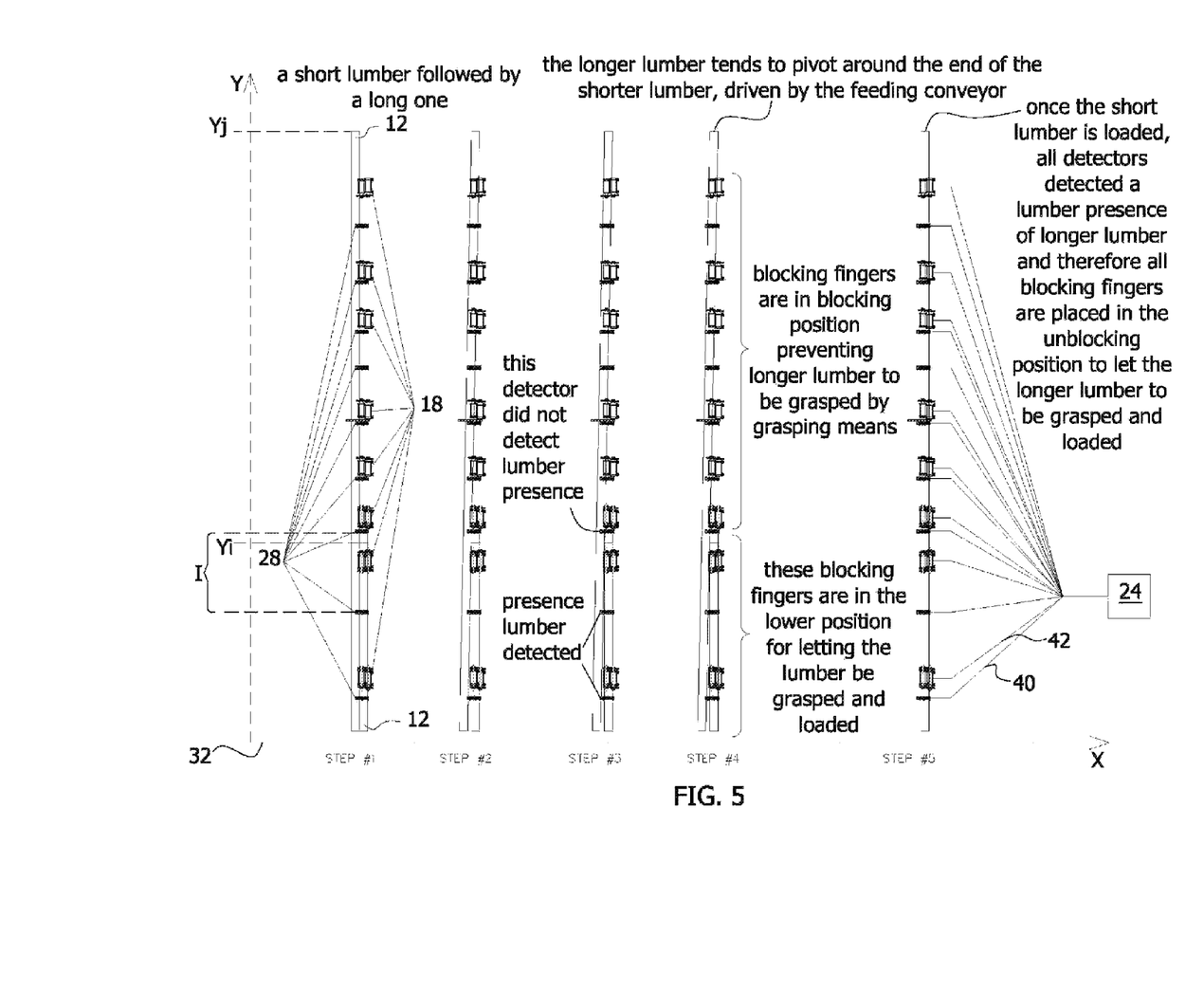
FIG. 5 is a schematic view of steps involved in performing the improved method according to a preferred embodiment of the present invention.

Now referring to FIGS. 2 and 5, detectors 28 (best shown in FIG. 5) used for monitoring a lumber presence along a corridor 30 (shown in FIG. 2) of the longitudinal conveying surface 26 of the feeding conveyor 14 are located transversally to the surface 26, preferably in line with one another, although other suitable dispositions may be used with the present invention, as apparent to a person skilled in the art.

The corridor 30 is a detection corridor, which may consist either of a detection line, area, or a lane having a predetermined width, extending continuously or partially from one side to the other of the longitudinal surface, and over which each lumber 12 conveyed will pass or cross. The detectors 28 may be of any kind, such as photocells or ultrasound detectors, or cameras, as long as they can detect a lumber presence in the detection corridor 30. While they are preferably placed along the corridor 30, underneath the conveying surface 26, they may also be placed over the conveying surface or on the side of each belt forming the conveying surface 26. Moreover, the detectors 28 may be positioned at any suitable distance of the conveying surface 26, so long as they each adequately detect the lumber presence within the associated segment of the detection corridor 30. By lumber presence, it is understood that the detectors 30 will detect the presence of a lumber segment or portion in the "field of view" or "field of detection" of the detector 30. In other words, the detectors 30 provide indication as to where up to a lumber 12 extends from the 0" side 32 along the transverse detecting corridor. As illustrated in FIG. 5, the 0" side 32 of the conveying surface 26 can be considered as an X-axis, each lumber 12 having one end aligned with the axis, and the other end of the lumbers extending to a different height Y. For example, in the embodiment illustrated in FIG. 5, nine detectors 28 are shown. Starting from the 0" side (or X-axis), if the first two detectors 28 detect a lumber presence, and the subsequent detectors 28 (third detector to the ninth) do not detect any lumber presence, it can be considered that the lumber's length extends from the 0" side 32 to a height Yi, in the interval I between the second and third detectors 30. It is worth mentioning that depending on the applications for which the lumber transfer system 10 is intended for, the detectors 30 may or may not be equally spaced from one another.

It is also worth mentioning that instead of having a plurality of detectors 30 to be used for detecting a presence or a given length of a given piece of lumber 12, other suitable detecting means, such as a scanner for example, could be used for recognizing a given profile of a first lumber 12, and comparing it with the profile of a second or subsequent piece of lumber 12, in order to selectively, independently and operatively control corresponding blocking fingers 18 in order to ensure that the second piece of lumber 12, will not rotate about the first piece of lumber 12, and so as to ensure that these two pieces of lumber 12 are preferably disposed in substantial parallel relationship with one another, prior to being dispensed out of the exit 20 of the feeding conveyor 14, in order to improve individual transfer of the pieces of lumber 12 by the grasping assembly 22 towards the outfeed conveyor 16.

Each detector 28 is individually linked or connected, preferably by wire, to at least one input device of a controller 24. Wireless connections from the detectors 28 to the controller may also be considered. The controller 24 receives individual and independent detecting signals from each detector 28.

Figure 3:
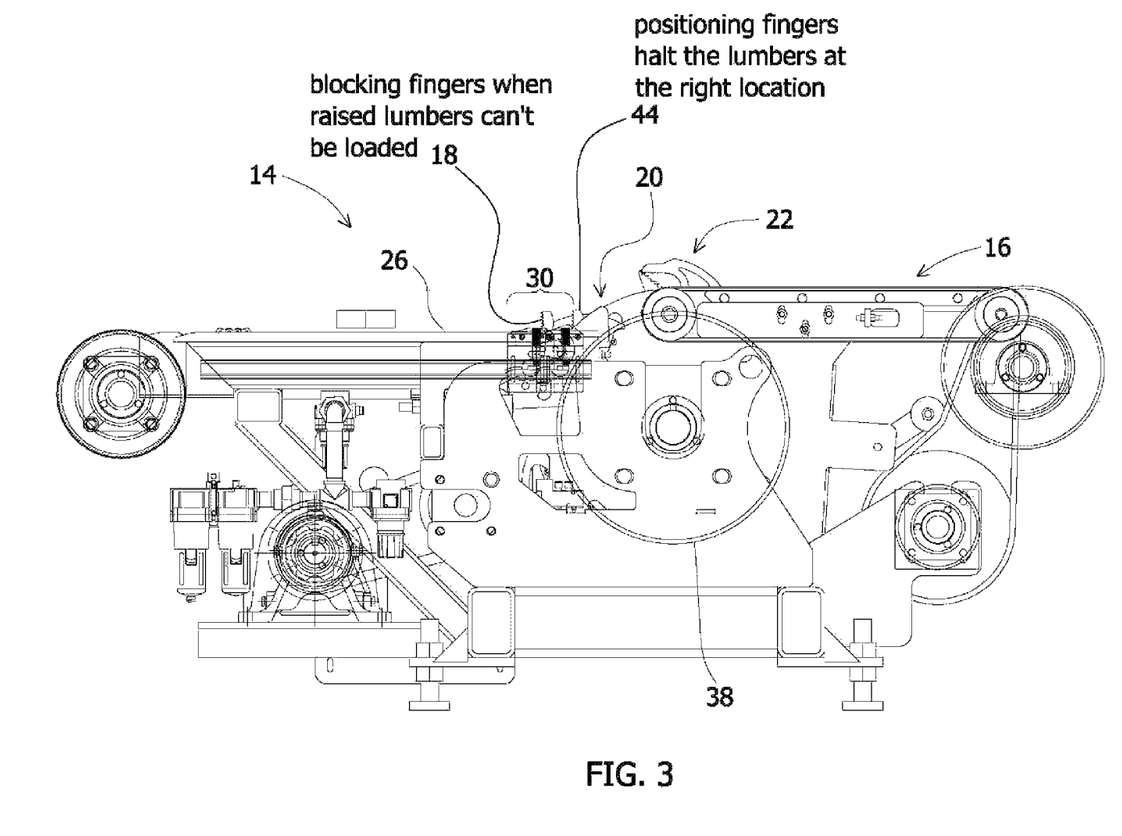
FIG. 3 is a side view of a portion of the lumber transfer system shown in FIG. 1.
Figure 4:
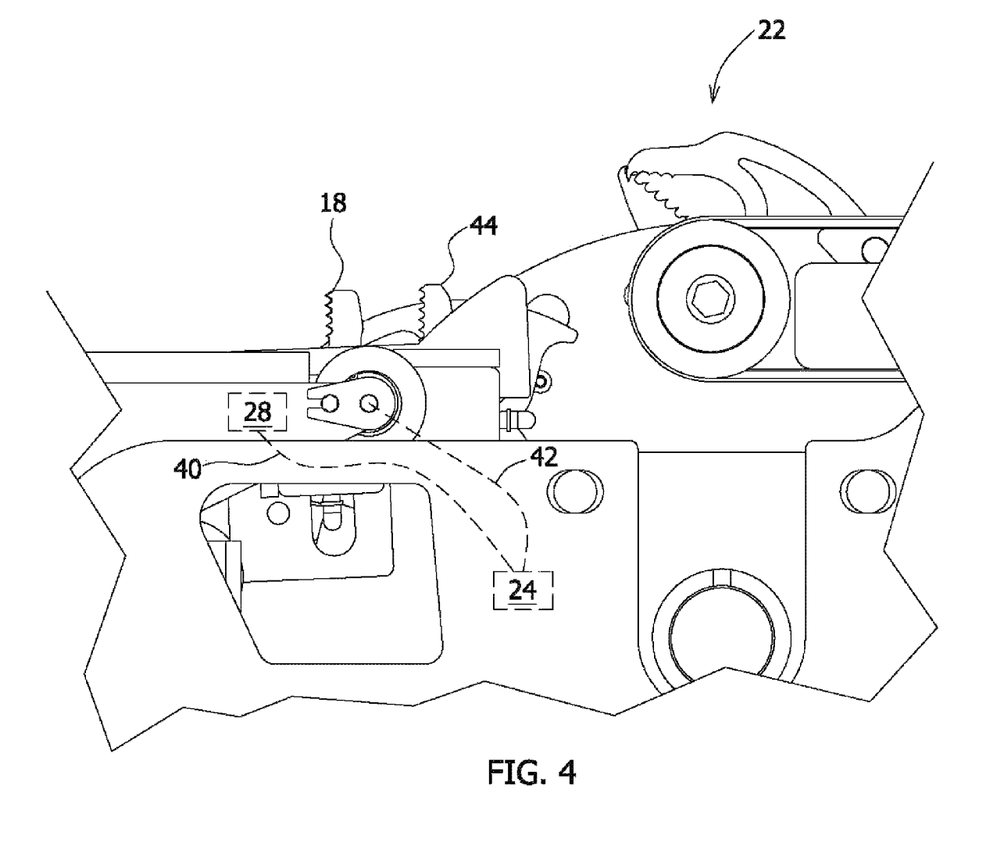
FIG. 4 is an enlarged view of a portion of what is shown in FIG. 3.

Referring to FIGS. 3 and 4, motorized blocking fingers 18 may be located downstream of the detecting corridor 30, or in other words somewhere between the detection corridor 30 and the exit 20 of the feeding conveyor 14, or even within the detection corridor 30. The blocking fingers 18 are for blocking or stopping a lumber 12 arriving at the exit or delivering end 20 of the feeding conveyor 14, preventing the lumber 12 from reaching an outer edge of a disk 38 while waiting to be transferred by the grasping assembly 22. Preferably, the blocking fingers 18 are placed in line with one another, and close to the detectors 28. Each blocking finger 18 is individually controlled and capable of moving between a blocking position and an unblocking position. The blocking position preferably consists of a raised position, where the fingers 18 extend over the conveying surface 26. In the unblocking position, the fingers 18 may be lowered at the conveying surface 26 level, or placed underneath it. The fingers 18 can be moved or rotated by connecting them to a shaft and to motorized or actuating devices, such as motors, pneumatic or hydraulic cylinders, and the like. The blocking position (also referred to herein as "blocking configuration") corresponds to any suitable configuration in which the blocking finger 18 locally obstructs the passage of lumber and the unblocking position (also referred to herein as "unblocking configuration" or "conveying configuration") corresponds to any suitable configuration in which the blocking finger 18 locally allows passage of the lumber along the conveying surface.

Similarly to what was discussed in regards to the detectors 28, the blocking fingers 18 need not be disposed along a straight line, and may be placed in other suitable manners next to, downstream, or about their associated detectors 28, depending on the particular applications for which the lumber transfer system 10 is intended, and the desired end results, as can be easily understood by a person skilled in the art.

Both the detectors 28 and the motorized blocking fingers 18 are connected to a controller 24 (as shown in FIG. 4), which is preferably a PLC (Programmable Logic Controller). The controller 24 may consist of a single PLC or may be distributed in different PLCs. Of course, other types of controllers may be used, such as a server or a PC (personal computer) or in it simplest form, a connecting switch board for interconnecting relays. In addition to inputs 40 for receiving the detecting signals from the detectors 30, the controller 24 is provided with outputs 42 for sending independent control signals to the motorized blocking fingers 18 respectively. The control signals are sent in response to the detecting signals, for moving the respective blocking fingers 18 for which a lumber presence is detected from a blocking to an unblocking position and otherwise keeping the respective motorized blocking fingers 18 in their blocking position. Between each lumber 12 detected, the fingers 18 may be kept in an unblocking position, or may return to a blocking position.

Preferably, positioning fingers 44 are placed right after (or in other words, "downstream of") the blocking fingers 18, near the exit of the feeding conveyor 14. The positioning fingers 44 lie up or halt the lumbers 12 that have passed the blocking fingers 18 in the proper location and position so that they may be adequately grasped or pinched by the grasping assembly 22.

The grasping assembly 22 may be of any type, but is preferably mounted on disks 38 and made of a tooth and a lumber grasping arm, acting as pliers whose action is controlled by the controller 24. The rotation of the disks 38 is also controlled by the controller 24. More particularly, lumbers 12 freed by the blocking fingers 18, and halted by the positioning fingers 44 are grasped between the tooth and the grasping fingers and regularly transferred onto the outfeed conveyor 16, since the disks 22 and outfeed conveyor belts rotate at an even and predetermined speed.

The outfeed conveyor 16 is preferably a belt conveyor but it may also consist of a chain conveyor. Still preferably, the outfeed conveyor 16 is connected to a downstream lug chain provided with pegs, where individual transferred lumbers are placed, in between two subsequent pegs.

Preferably, the feeding conveyor 14, the positioning fingers 44, the grasping assembly 22 and the outfeed conveyor 16 are all connected to the controller 24, which controls, manages and synchronizes the overall operation of the transfer lumber system 10, including the speed of the feeding 14 and outfeed 16 conveyors, and the speed of the grasping assembly 22, as can be easily understood by a person skilled in the art.

Referring to FIG. 5, the invention also concerns a method or process for individually transferring the substantially parallel lumbers 12 from the feeding conveyor to the outfeed conveyor.

The process involves a first step of monitoring a lumber presence along the corridor on the longitudinal conveying surface of the feeding conveyor using the detectors 28 placed transversally to the surface.

A second step consists of receiving detecting signals on inputs of the controller 24 from the respective detectors. Each detector is respectively associated to a motorized blocking finger 18. The detectors 30 are preferably located downstream of the corridor and transversally spaced along the conveying surface. The motorized blocking fingers 18 are capable of moving between blocking and unblocking positions.

A third step involves sending independent control signals through outputs of the controller 24 to the motorized blocking fingers 18 respectively, in response to the detecting signals. The controller 24 sends the control signals to the motorizing or actuating means of the blocking fingers 18 for moving the fingers for which a lumber presence is detected from a blocking to an unblocking position and otherwise keeping the respective motorized blocking fingers 18 in their blocking position.

There are several ways of obtaining this result, and one way of implementing it is the following: starting from the 0" side 32, for the first detector 30 not detecting a lumber presence, the blocking fingers 18 located above or upward (relative to the 0" side) this detector 30 will be activated and placed in the blocking position while those located below or downward of the detector 30 will be lowered or placed in the unblocking position. This will results in letting a shorter lumber pass while blocking a subsequent upstream longer lumber, until the longer lumber presence is detected. Such process is repeated for each conveyed lumber 12.

As can be easily understood from the above-described, the preferred embodiment of the lumber transfer system illustrated in the accompanying drawings is preferably intended for minimizing components and assembling steps, while providing a suitable manner for easily, quickly and efficiently transferring lumbers from a feeding conveyor to a outfeed conveyor.

The lumber transfer system 10 and corresponding parts are preferably made of substantially rigid materials, such as metallic materials (stainless steel, etc.), hardened polymers, composite materials, polymeric materials, and/or the like, so as to ensure a proper operation thereof depending on the particular applications for which the lumber transfer system 10 is intended and the different parameters in cause, as apparent to a person skilled in the art.

As may now be appreciated, the present invention is a substantial improvement over the lumber transfer systems of the prior art in that, by virtue of its design and components, as briefly explained herein, the lumber transfer system 10 according to the present invention enables to individually control blocking fingers in response to corresponding detection signals so as to prevent a portion of a longer lumber to pivot around the extremity of a shorter downstream lumber, in order to prevent the longer lumber from being grasped and transferred into the outfeed conveyor with the shorter lumber.

Another important advantage resulting from the present invention is that human intervention is substantially reduced in order to ensure a proper alignment between a pair of neighbouring lumbers, especially in cases when one is much longer than the other, and that the resulting parallel lumbers can be thus be individually transferred from the feeding conveyor to a outfeed conveyor in a much improved manner (faster, more reliable, etc.), thereby significantly improving productivity and other desirable factors related to the operation of a mill.

Of course, numerous modifications could be made to the above-described embodiments without departing from the scope of the invention, as apparent to a person skilled in the art.

What is claimed is:

1. A lumber transfer system for transferring pieces of lumber along a conveying path, the lumber transfer system comprising:

a feeding conveyor having a conveying surface for receiving the pieces of lumber in a substantially transverse orientation with respect to the conveying path, and for conveying the pieces of lumber therealong toward an exit, the feeding conveyor further defining a detection corridor oriented substantially transversely with respect to the conveying path;

detectors being spaced apart along the detection corridor of the feeding conveyor, each detector being used for locally monitoring a lumber presence and for producing a corresponding detection signal;

blocking fingers located in proximity to the detectors and spaced apart transversely along the conveying surface, each of the blocking fingers being independently operable between a blocking configuration for locally blocking the pieces of lumber and an unblocking configuration for locally conveying the pieces of lumber; and a controller having:

input devices, each of the input devices being operatively connected to one of the detectors for receiving the corresponding detection signal; and output devices, each of the output devices being operatively connected to one of the blocking fingers for transmitting an independent control signal to a corresponding one of the blocking fingers in response to a detection signal of an associated detector, to move said corresponding one of the blocking fingers in the unblocking configuration when the lumber presence is locally detected and in the blocking configuration when the lumber presence is locally undetected.

2. The lumber transfer system according to claim 1, wherein the blocking configuration of each of the blocking fingers corresponds to a raised position where the concerned blocking finger extends over the conveying surface.

3. The lumber transfer system according to claim 2, wherein the unblocking configuration of each of the blocking fingers corresponds to a lowered position where the concerned blocking finger is drawn under the conveying surface.

4. The lumber transfer system according to claim 3, wherein the blocking fingers are operable by a motorized assembly.

5. The lumber transfer system according to claim 4, wherein each of the detectors is associated to one of the blocking fingers.

6. The lumber transfer system according to claim 5, wherein the detection corridor defines a lane having a predetermined width.

7. The lumber transfer system according to claim 6, wherein each of the detectors is selected from the group consisting of a photocell detector, an ultrasound detector and a camera; wherein the controller is selected from the group consisting of a programmable logic controller (PLC), a distributed system of PLCs, a server, a personal computer (PC) and a connecting switch board; and wherein the conveying surface is provided by a conveyor selected from the group consisting of a belt conveyor and a chain conveyor.

8. The lumber transfer system according to claim 7, further comprising positioning fingers provided near the exit of the conveying surface of the feeding conveyor for aligning an exiting one of the pieces of lumber.

9. The lumber transfer system according to claim 8, further comprising a grasping assembly provided near the exit of the conveying surface of the feeding conveyor for grasping the pieces of lumber located at the exit.

10. The lumber transfer system according to claim 9, wherein the grasping assembly comprises a tooth and a lumber grasping arm, for grasping the pieces of lumber thereinbetween, the tooth and the lumber grasping arm being operatively mounted to at least one rotatable disk for transferring the pieces of lumber.

11. The lumber transfer system according to claim 10, wherein the tooth and lumber grasping arm are operatively connected to and controlled by the controller, and wherein each disk is operatively connected to and controlled by the controller.

12. The lumber transfer system according to claim 11, further comprising an outfeed conveyor provided at an output region of the grasping assembly for receiving the pieces of lumber grasped by the grasping assembly.

13. The lumber transfer system according to claim 12, wherein the outfeed conveyor is selected from the group consisting of a belt conveyor and a chain conveyor.

14. The lumber transfer system according to claim 13, wherein the outfeed conveyor is connected to a downstream lug chain provided with pegs for separating the pieces of lumber received thereon.

15. The lumber transfer system according to claim 14, wherein the outfeed conveyor is operatively connected to and controlled by the controller.

16. The lumber transfer system according to claim 15, wherein the controller is configured to control, manage, synchronize the speed of mechanisms of the lumber transfer system, selected from the group consisting of the feeding conveyor, the grasping assembly and the outfeed conveyor.

17. A lumber transfer system for improving individual transfer of elongated pieces of lumber from a feeding conveyor to an outfeed conveyor, the lumber transfer system comprising:
  a feeding conveyor having a conveying surface for conveying the pieces of lumber along a conveying path, the feeding conveyor having an inlet for receiving the pieces of lumber in a substantially transverse orientation with respect to the conveying path, and an outlet for dispensing pieces of lumber in an aligned manner with respect to each other, the feeding conveyor comprising a detection corridor extending substantially across the conveying surface in a direction substantially transverse with respect to the conveying path;
  detectors being spaced apart about the detection corridor of the feeding conveyor, each of the detectors being positioned at a designated location for locally detecting the presence of a segment of a first piece of lumber and for generating a corresponding detection signal;
  blocking fingers being spaced apart about the detection corridor, adjacent to the detectors, each of the blocking fingers being positioned at a designated location for locally and selectively blocking the passage of a segment of a second piece of lumber following the first piece of lumber on the conveying surface in response to a corresponding control signal, each of the blocking fingers being operable between a conveying configuration for locally allowing a passage of said segment of the first piece of lumber along the conveying surface, and a blocking configuration for locally blocking the passage of said segment of the second piece of lumber following the first piece of lumber, each of the blocking fingers being operable independently from one another in response to respective control signals; and
  a controller having:
    at least one input device operatively connected to the detectors for receiving corresponding detection signals of each one of the detectors positioned about the detection corridor; and
    at least one output device connected to the blocking fingers for sending corresponding control signals to each one of the blocking fingers positioned about the detection corridor,
  the controller being configured for sending an independent control signal to each one of the blocking fingers in response to a corresponding detection signal of an associated detector in order to be able to individually, independently and selectively operate all of the blocking fingers, such that a given blocking finger is operated in the conveying configuration when the presence of a segment of the first piece of lumber is locally detected by its associated detector for allowing passage of the first piece of lumber, said given blocking finger being further operated in the blocking configuration when the presence of a segment of the first piece of lumber is locally undetected by its associated detector for blocking the passage of the second piece of lumber following the first piece of lumber on the conveying surface along said given blocking finger, in order to orientate pairs of first and second pieces of lumber with respect to each other, so as to improve individual transferring into the outfeed conveyor.

18. A method for individually transferring substantially parallel pieces of lumber on a feeding conveyor toward an exit thereof, along a conveying path of a lumber transfer system, the pieces of lumber being provided in a substantially transverse orientation with respect to the conveying path, the method comprising the steps of:
  a) monitoring a lumber presence along a detection corridor on a conveying surface of the feeding conveyor, using detectors spaced apart along the detection corridor, the detection corridor being oriented substantially transversely with respect to the conveying path;
  b) associating the detectors to motorized blocking fingers located in proximity to the detectors and spaced apart transversally along the conveying surface, each of the blocking fingers being independently operable between a blocking configuration for locally blocking the pieces of lumber and an unblocking configuration for locally conveying the pieces of lumber; and
  c) independently commanding each of the blocking fingers for which a lumber presence is detected in step a) into the unblocking configuration and each of the blocking fingers for which a lumber presence is undetected in step a) into the blocking configuration.

19. A method according to claim 18, further comprising the step of:
  d) aligning an exiting one of the pieces of lumber located at the exit of the conveying surface of the feeding conveyor via positioning fingers provided near the exit.

20. A method according to claim 19, further comprising the steps of:
  e) grasping the pieces of lumber located at the exit via a grasping assembly provided near the exit of the conveying surface of the feeding conveyor; and
  f) conveying the pieces of lumber grasped by the grasping assembly via an outfeed conveyor provided at an output region of the grasping assembly.

* * * * *